US012759394B2

(12) United States Patent
Schubert et al.

(10) Patent No.: US 12,759,394 B2
(45) Date of Patent: Oct. 13, 2026

(54) OPERATING ELEMENT ARRANGEMENT FOR A MOTOR VEHICLE FOR ACHIEVING AN AUTOMATIC TOLERANCE COMPENSATION AND METHOD FOR MOUNTING THE SAME

(71) Applicant: AUDI AG, Ingolstadt (DE)

(72) Inventors: André Schubert, Ingolstadt (DE); Thomas Liepold, Gaimersheim (DE)

(73) Assignee: AUDI AG, Ingolstadt (DE)

( * ) Notice: Subject to any disclaimer, the term of this patent is extended or adjusted under 35 U.S.C. 154(b) by 350 days.

(21) Appl. No.: 18/664,538

(22) Filed: May 15, 2024

(65) Prior Publication Data

US 2025/0010713 A1 Jan. 9, 2025

(30) Foreign Application Priority Data

Jul. 5, 2023 (DE) ......................... 102023117719.2

(51) Int. Cl.
*H01H 19/03* (2006.01)
*B60K 35/10* (2024.01)

(52) U.S. Cl.
CPC ............. *B60K 35/10* (2024.01); *H01H 19/03* (2013.01); *B60K 2700/00* (2013.01); *H01H 2215/028* (2013.01); *H01H 2231/026* (2013.01)

(58) Field of Classification Search
CPC ....... H01H 2221/032; H01H 2003/323; H01H 9/0207; H01H 2215/028; H01H 3/125; H01H 13/705; H01H 13/14; H01H 13/04; H01H 13/10; H01H 13/70; H01H 13/704; H01H 13/7065; H01H 13/7006; H01H 13/7057; H01H 13/78; H01H 13/79;
(Continued)

(56) References Cited

U.S. PATENT DOCUMENTS

2008/0316064 A1* 12/2008 Wang ..................... H01H 13/14
341/22
2019/0042007 A1* 2/2019 Lu .......................... G06F 3/033
(Continued)

FOREIGN PATENT DOCUMENTS

DE 102012009173 A1 11/2012
DE 102012221228 A1 5/2014
(Continued)

OTHER PUBLICATIONS

Examination Report issued on Mar. 6, 2024, in corresponding German Application No. 102023117719.2, 8 pages.

*Primary Examiner* — Ahmed M Saeed
(74) *Attorney, Agent, or Firm* — Maier & Maier, PLLC

(57) ABSTRACT

An operating element arrangement for a motor vehicle, with an operating element and an attachment device for connecting the operating element to a body of the motor vehicle. The operating element is mounted on the attachment device so as to be displaceable along an actuation path. An adjustment device for adjusting the actuation path has a first adjustment element, a second adjustment element frictionally coupled to the first adjustment element, an adjustment element end stop for limiting the actuation path and a threaded device. The first adjustment element is mounted so as to be rotatable over a first range of rotation angles and the second adjustment element over a second range of rotation angles about a common axis of rotation.

20 Claims, 2 Drawing Sheets

(58) Field of Classification Search
CPC .... H01H 13/52; H01H 13/703; H01H 13/507; H01H 3/12; H01H 13/20; H01H 3/60; H01H 19/03; H01H 2231/026; B60K 35/10; B60K 2700/00; B60R 16/005; B60R 11/00; B60R 2011/0052; B60R 2011/008
See application file for complete search history.

(56) References Cited

U.S. PATENT DOCUMENTS

| | | | | |
|---|---|---|---|---|
| 2019/0189372 | A1* | 6/2019 | Grillo | H01H 13/70 |
| 2022/0344112 | A1* | 10/2022 | Kleine-Hollenhorst | B60K 35/10 |
| 2023/0187150 | A1* | 6/2023 | Kuchler | H01H 13/70 400/472 |

FOREIGN PATENT DOCUMENTS

| | | | |
|---|---|---|---|
| DE | 102016110754 | A1 | 12/2017 |
| DE | 102018108307 | A1 | 10/2019 |
| DE | 102019100396 | A1 | 7/2020 |

* cited by examiner

OPERATING ELEMENT ARRANGEMENT FOR A MOTOR VEHICLE FOR ACHIEVING AN AUTOMATIC TOLERANCE COMPENSATION AND METHOD FOR MOUNTING THE SAME

FIELD

The invention relates to an operating element arrangement for a motor vehicle, with an operating element and an attachment device for connecting the operating element to a body of the motor vehicle, wherein the operating element is mounted on the attachment device so as to be displaceable along an actuation path. The invention further relates to a method for mounting an operating element arrangement on a body of a motor vehicle.

BACKGROUND

The prior art includes document DE 10 2016 110 754 A1, for example. This describes a fastening device for fastening a first component to a second component, which is designed with a spacer element which is designed to position the first component at a distance from the second component in a first axis and to fix the first component at a distance from the second component, wherein the spacer element has a stop surface which serves to support the fastening device on the second component, and wherein the spacer element is designed in one piece, and a tolerance element which is designed to movably receive the spacer element in the first direction and to compensate for tolerances between the first component and the second component in a second axis and in a third axis, wherein the tolerance element is designed in one piece. The fastening device is used to attach a door handle to a door of a motor vehicle.

SUMMARY

It is an object of the invention to propose an operating element arrangement for a motor vehicle which has advantages over known operating element arrangements, and which in particular despite comparatively large tolerances of the body, enables the defined adjustment of the actuation path, in particular the adjustment to a defined length, while at the same time allowing simple mounting.

This is achieved according to the invention with an operating element arrangement for a motor vehicle. It is provided that an adjustment device for adjusting the actuation path has a first adjustment element, a second adjustment element frictionally coupled to the first adjustment element, an operating element end stop for limiting the actuation path and a threaded device, wherein the first adjustment element is mounted so as to be rotatable over a first range of rotation angles and the second adjustment element over a second range of rotation angles about a common axis of rotation with respect to the attachment device, and wherein the adjustment device is designed such that a rotational movement of the second adjustment element over a first part of the second range of rotation angles by means of the threaded device causes a displacement of the first adjustment element in the axial direction and occurs over a second part of the second range of rotation angles with the first adjustment element being fixed in the axial direction.

It is pointed out that the embodiments explained in the description are not restrictive; rather, any variations of the features disclosed in the description, the claims and the figures can be implemented.

The operating element arrangement is preferably part of the motor vehicle, but can of course also be separate from it, in particular before the operating element arrangement is mounted on the motor vehicle. The operating element arrangement has the operating element which can be actuated by an operator at least after the operating element arrangement has been mounted on the motor vehicle, namely by applying an operating force to the operating element. The operating element is in particular part of an electrical switch, for example a push button, a key switch or the like.

Preferably, the operating element is associated with an actuation sensor which detects the application of the operating force to the operating element and generates a corresponding signal. For example, the sensor evaluates a position of the operating element, wherein the sensor generates a first signal when the operating element is in a first position and a second signal when the operating element is in a second position different from the first position. The first position is, for example, an initial position in which the operating element is not actuated, and the second position is an actuating position in which the operating element is subjected to the operating force. In addition or alternatively to the position, the sensor evaluates the operating force, a speed of the operating element along the actuation path, an acceleration of the operating element along the actuation path or the like.

The operating element is preferably arranged in a recess in the body. The recess is located in particular in an outer skin of the body, for example in a sheet metal skin or in a plastic skin of the body. Preferably, in addition to the outer skin, the body has a supporting structure to which the outer skin is attached. The outer skin is preferably attached to the supporting structure by means of a material bond, in particular by gluing; in particular, the outer skin is glued to the supporting structure. Due to the fastening of the outer skin to the supporting structure, comparatively large deviations in the distance between the supporting structure and the outer skin must be tolerated, which can range from one millimeter to several millimeters.

The operating element is connected to the body of the motor vehicle by means of the attachment device, i.e. it is held to the body using the attachment device. Preferably, the attachment device is firmly connected to the body in order to ensure that the operating element is reliably held thereto. The operating element is mounted on the attachment device so that it can be moved, namely along the actuation path. Accordingly, if the attachment device is connected to the body, the operating element is also mounted so that it can be moved relative to the body, namely via the attachment device. The actuation path over which the operating element is movably mounted is usually smaller than the tolerance for the attachment of the outer skin to the supporting structure. This makes it necessary to arrange the operating element in a defined position relative to the body during mounting and to set a defined actuation path, in particular an actuation path with a defined length.

For this reason, the operating element arrangement has the adjustment device. By means of this, the actuation path, in particular the length of the actuation path, is adjusted during mounting of the operating element arrangement on the body of the motor vehicle. This achieves a precisely defined actuation path or a precisely defined length of the actuation path despite the comparatively large tolerance, so that irritation of the operator due to different actuation paths of several operating elements of one and the same motor vehicle or of different motor vehicles is reliably avoided. At the same time, however, the installation of the operating element arrangement on the motor vehicle should be particularly simple, i.e. it should not require numerous and complicated steps to adjust the actuation path.

For this purpose, the adjustment device has two adjustment elements, namely the first adjustment element and the second adjustment element. The two adjustment elements are mounted so as to be rotatable about the common axis of rotation, preferably with respect to a base body of the attachment device. The adjustment device is also assigned to the operating element end stop, which serves to limit the actuation path. The operating element end stop is designed and arranged such that after the operating element arrangement has been mounted on the motor vehicle, the operating element is spaced apart from the operating element end stop in its first position and rests against the operating element end stop in its second position to limit the actuation path.

Preferably, the operating element end stop is part of a plurality of operating element stops, wherein a further one of the operating element stops is arranged at a distance from the operating element end stop, so that the operating element can be displaced between the operating element stops. In particular, the operating element rests against a first of the operating element stops in the first position and against a second of the operating element stops in the second position. The first operating element end stop is preferably formed by the body of the motor vehicle, in particular by the outer skin of the body. The second operating element end stop can be the previously mentioned operating element end stop of the adjustment device.

As already mentioned, the operating element is arranged in a recess in the body, for example. This recess is delimited by an edge formed by the body, which preferably completely and continuously surrounds the recess, i.e. is manufactured with a closed edge. The operating element preferably has a base body located in the recess. A collar extends from this on the one side of the edge, which in one position of the operating element, in particular in the first position, rests against the edge, which thereby represents the first operating element end stop. In the first position, the operating element is positioned in relation to the body by resting against the first operating element end stop. However, the distance between the first operating element end stop and the second operating element end stop of the adjustment device, which determines the length of the actuation path, depends on the tolerances between the outer skin and the supporting structure. This distance can be adjusted using the adjustment device.

The adjustment device also has the threaded device. The threaded device is used to adjust the actuation path. Preferably, a first part of the threaded device is made on the first adjustment element. In particular, this first part of the thread device is in the form of an external thread. A second part of the threaded device is present, for example, on the attachment device or its base body or an intermediate component of the operating element arrangement. The second part of the threaded device is in particular manufactured as an internal thread into which the external thread of the first part engages.

The two adjustment elements are arranged coaxially to each other and are mounted so they can rotate about the common axis of rotation. They are also connected to one another in a force-fitting or friction-fitting manner, in particular exclusively in a force-fitting or friction-fitting manner. The actuation path is adjusted by rotating the second adjustment element in a mounting direction about the axis of rotation by applying a torque to the second adjustment element. The torque is transferred from the second adjustment element to the first adjustment element, namely via the force-fitting connection. As a result, at least temporarily, namely over the first range of rotation angles, a rotational movement of the first adjustment element is caused, which is converted into an axial displacement of the first adjustment element by means of the threaded device.

The adjustment device is designed such that the second adjustment element is rotatable over the entire second range of rotation angles, but the first adjustment element is only rotatable over the first range of rotation angles, which is smaller. The first range of angles of rotation has the same extension as the first part of the second range of angles of rotation. During mounting of the operating element arrangement, the second adjustment element is rotated over the entire second range of rotation angles, i.e. from a first limitation of the second range of rotation angles to a second limitation of the second range of rotation angles, wherein the first limitation and the second limitation limit the second range of rotation angles on opposite sides.

During the rotational movement of the second adjustment element over the first part of the second range of rotation angles, the first adjustment element is carried along by the second adjustment element so that it passes through the entire first range of rotation angles. In the first part of the second range of rotation angles, the adjustment elements are fixed against each other in the circumferential direction due to the force-fitting connection, i.e. they rotate together around the axis of rotation. If the first adjustment element reaches the end of the first range of rotation angles, it is fixed in the circumferential direction and can therefore no longer be moved by the second adjustment element. The second adjustment element then passes through the second part of the second range of rotation angles. In this case, a holding torque of the force-fitting connection is exceeded, so that the two adjustment elements rotate relative to each other.

In other words, the rotational movement of the second adjustment element over the first part of the second range of rotation angles causes a rotational movement of the first adjustment element, which is converted into the displacement of the first adjustment element in the axial direction using the threaded device. The first adjustment element can only be displaced in the axial direction over a certain displacement range, whereby after passing through the first range of rotation angles it reaches the end of the displacement range and is thereby fixed in the axial direction. Due to the fixing in the axial direction, the first adjustment element is also fixed in the circumferential direction in the mounting direction of rotation, so that no further rotational movement of the first adjustment element is possible. In order to always achieve a similar mounting sequence for the operating element arrangement, the second adjustment element should continue to be rotated even when the first adjustment element is fixed, namely over the entire second range of rotation angles, wherein the rotational movement of the second adjustment element takes place over the second part of the second range of rotation angles when the first adjustment element is fixed. The fixed first adjustment element means that the first adjustment element is fixed or can no longer be moved in the axial direction.

The described design of the operating element arrangement enables a precise adjustment of the actuation path, in particular the length of the actuation path, by appropriately arranging the operating element end stop. The operating element end stop is either displaced using the adjustment elements, i.e. displaced due to the rotary movement of the second adjustment element, or alternatively fixed in a defined position due to the rotary movement of the second adjustment element. In any case, the operating element end stop is arranged by the rotary movement of the adjustment elements in such a way that it has a certain distance from the operating element in the initial position of the operating element.

Particularly preferably, of course, there are several adjustment devices, i.e. at least one further adjustment device in addition to the adjustment device described. The adjustment devices are arranged at a distance from each other and are used independently to adjust the actuation path. For example, there are at least three or at least four such adjustment devices. Each of the adjustment devices is designed as described in this description. If the operating element arrangement is equipped with the intermediate element, there are preferably multiple operating element stops on the intermediate element and the adjustment devices each serve to position the same intermediate element.

A further development of the invention provides that the operating element is guided with respect to a base body of the attachment device by means of at least one guide device, and/or that the operating element end stop is spaced apart from the operating element in a first position of the operating element and rests against the operating element in a second position of the operating element to limit the actuation path. As already explained, the operating element on the attachment device can be moved along the actuation path. The actuation path is approximately straight, but tilting of the operating element is preferably permitted. For example, the operating element has a guide device on its edge which cooperates with the edge delimiting the recess in order to guide the operating element in the recess and in particular to center it in the recess. The guide device is designed, for example, as a chamfer or as a curve.

Additionally or alternatively, the operating element end stop is arranged in different positions of the operating element at different distances from the operating element. In the first position of the operating element, there is a first distance between the operating element and the operating element end stop, and in the second position there is a second distance which is smaller than the first distance. The first distance is usually greater than zero, whereas the second distance is zero, so that the operating element in its second position rests against the operating element end stop and the actuation path is limited. The described design of the operating element arrangement enables the realization of the advantages already mentioned.

A further development of the invention provides that the operating element end stop is designed on the first adjustment element or is present on an intermediate component that is drivingly coupled to the first adjustment element via the threaded device. In a first variant of the operating element arrangement, the operating element end stop is located on the first adjustment element and is displaced together with it, wherein the displacement is achieved during the rotational movement of the adjustment element with the aid of the threaded device. The operating element end stop is located, for example, on the front side of the first adjustment element, i.e. it is formed by the front side of the first adjustment element which faces the operating element.

In a second variant of the operating element arrangement, the operating element end stop is arranged away from the first adjustment element, namely on the intermediate component. The intermediate component is drive-connected to the first adjustment element via the threaded device, so that the rotary movement of the first adjustment element causes a displacement of the intermediate component and thus of the operating element end stop in the axial direction or at least a fixing of the intermediate component at a certain distance from the attachment device. This design of the operating element arrangement also serves to achieve the advantages explained in a constructively advantageous manner.

A further development of the invention provides that the operating element end stop encompasses a spring element receptacle in which a spring element is arranged which urges the operating element in the direction facing away from the operating element end stop. The spring element generates a spring force which acts as a restoring force on the operating element. The restoring force pushes the operating element from its actuating position towards its starting position. The spring element is arranged in the spring element receptacle, which is surrounded by the operating element end stop. In particular, the operating element end stop forms a continuous edge of the spring element receptacle, so that in at least one position the operating element rests against the operating element end stop, completely closing the spring element receptacle. The spring element is preferably designed as a spiral spring. By enclosing the spring element receptacle and thus the spring element with the operating element end stop, the operating element is pushed particularly evenly towards its starting position, so that a particularly good appearance of the operating element arrangement is achieved. In addition, a particularly uniform restoring force is achieved, especially when using several adjustment devices, since a separate tolerance compensation is carried out for each of the adjustment devices.

A further development of the invention provides that the attachment device has an actuation sensor for determining a deflection of the operating element along the actuation path. Such a configuration has already been mentioned. The actuation sensor is particularly preferably arranged on the base body of the attachment device and is thus stationary with respect to the body. The actuation sensor can be used to reliably detect whether the operating element has been actuated.

A further development of the invention provides that the second range of rotation angles extends from a starting angle of rotation to a final angle of rotation and is limited to the final angle of rotation by means of an adjustment element end stop. The second range of angles of rotation is limited by the start rotation angle and the end rotation angle on opposite sides, so that the start rotation angle and the end rotation angle accommodate the second range of angles of rotation between them. The starting angle of rotation is the angle of rotation in which the second adjustment element is present before the operating element arrangement is mounted on the motor vehicle; in particular, the second adjustment element is arranged at the starting angle of rotation ex works.

During mounting of the operating element arrangement, the second adjustment element is rotated over the entire second range of rotation angles, i.e. starting from the start angle of rotation up to the final angle of rotation. In the final angle of rotation, the second adjustment element rests against the adjustment element end stop, so that the second adjustment element cannot be rotated beyond the final angle of rotation from the direction of the starting angle of rotation, but is rather limited to this.

The adjustment element end stop is manufactured in particular on the attachment device, preferably on its base body. The adjustment element end stop facilitates mounting of the operating element arrangement, since a person carrying out the mounting only turns the second adjustment element until it rests against the adjustment element end stop. Since the second adjustment element is rotated over the entire second range of rotation angles during mounting, the second range of rotation angles can also be referred to as the mounting range of rotation angles.

A further development of the invention provides that the adjustment device has an adjustment element locking device which allows a rotational movement of the second adjustment element from the direction of the starting angle of rotation in the direction of the final angle of rotation over a locking angle of rotation and prevents a rotational movement of the second adjustment element from the direction of the final angle of rotation in the direction of the starting angle of rotation in the locking angle of rotation. The adjustment element locking device prevents the second adjustment element from being turned back. The rotational movement of the second adjustment element in the direction of the final rotation angle is also permitted beyond the locking rotation angle, but prevents the rotational movement of the second adjustment element in the opposite direction when the locking rotation angle is reached.

The adjustment element locking device is arranged such that the locking angle of rotation lies between the starting angle of rotation and the final angle of rotation, preferably the difference between the locking angle of rotation and the final angle of rotation is at least 5%, at least 10% or at least 20% of the difference between the final angle of rotation and the starting angle of rotation. Additionally or alternatively, the difference between the final angle of rotation and the locking angle of rotation is no more than 30%, no more than 25% or no more than 20% of the difference between the final angle of rotation and the starting angle of rotation. The provision of the adjustment element locking device prevents unintentional adjustment of the actuation path after completion of mounting of the operating element arrangement.

A further development of the invention provides that the threaded device is designed such that during the rotational movement of the second adjustment element in the direction of the final angle of rotation, the operating element end stop is displaced towards the operating element or a minimum distance between the base body of the attachment device and the intermediate component is increased. Again, the operating element arrangement can be designed in two different variants, which can be selected independently of the variants explained above.

In a first variant, the rotary movement of the second adjustment element is converted into a displacement of the operating element end stop with the aid of the threaded device. In this case, the operating element end stop is preferably located on the first adjustment element. Preferably, it is provided that the first adjustment element is displaced in the axial direction by a corresponding rotational movement of the second adjustment element, in particular in a first direction of rotation, until it rests against the operating element and pushes the latter against the first operating element end stop. In this state, the operating element is held clamped between the first adjustment element and the first operating element end stop and therefore cannot be moved or operated. Therefore, by further rotational movement of the second adjustment element, the adjustment element is released again for displacement or actuation, in particular by rotating the second adjustment element in a second direction of rotation which is opposite to the first direction of rotation. Consequently, the first adjustment element is moved away from the operating element in the axial direction so that the operating element can be operated again.

In a second variant, the rotational movement of the second adjustment element is converted into an increase in the minimum distance between the base body of the attachment device and the intermediate component using the threaded device. For this purpose, the first adjustment element is preferably coupled to the intermediate component via the threaded device. Due to the rotational movement, a collar of the first adjustment element is displaced in the direction facing away from the intermediate component, in particular until it rests against the attachment device or its base body, preferably before the final angle of rotation is reached by the second adjustment element, in order to set the minimum distance between the base body and the intermediate component. In any case, a reliable adjustment of the actuation path is achieved.

A further development of the invention provides that the second adjustment element releases a locking element for resilient displacement in the starting angle of rotation and fixes it in a locking position at a rotation angle different from the starting angle of rotation. The locking element, for example, is part of the operating element arrangement and is used to attach the operating element arrangement to the body during mounting. Preferably, the locking element is designed on the attachment device. It is used to create a positive connection with the body. For this purpose, it can be moved between a release position and a locking position, whereby the locking position is an initial position of the locking element. The locking element is preferably designed to be elastic or is subjected to a spring force by a spring, so that when the locking element is deflected from the locking position towards the release position, a restoring force is generated which urges the locking element towards its locking position. In the locking position, the positive connection between the locking element and the body is established, whereas in the release position the connection is released.

It is now provided that the second adjustment element not only serves to adjust the actuation path, but also to secure the locking connection established using the locking element. For this purpose, the second adjustment element releases the locking element for elastic displacement from its locking position, provided that it is arranged below the starting angle of rotation. However, if it is present at an angle of rotation different from the starting angle of rotation, in particular at the final angle of rotation, it fixes the locking element in the locking position so that the locking connection established by means of the locking element is additionally secured. This creates a particularly reliable locking connection.

The invention further relates to a method for mounting an operating element arrangement on a body of a motor vehicle, in particular an operating element arrangement according to the statements in the context of this description, wherein the operating element arrangement has an operating element and an attachment device for connecting the operating element to the body of the motor vehicle and the operating element is mounted on the attachment device so as to be displaceable along an actuation path. It is provided that an adjustment device for adjusting the actuation path has a first adjustment element, a second adjustment element frictionally coupled to the first adjustment element, an operating element end stop for limiting the actuation path and a threaded device, wherein the first adjustment element is mounted so as to be rotatable over a first range of rotation angles and the second adjustment element over a second range of rotation angles about a common axis of rotation with respect to the attachment device, and wherein the adjustment device is designed such that a rotational movement of the second adjustment element over a first part of the second range of rotation angles by means of the threaded device causes a displacement of the first adjustment element in the axial direction and occurs over a second part of the second range of rotation angles with the first adjustment element being fixed in the axial direction.

The advantages of such a procedure or embodiment of the operating element arrangement have already been discussed. Both the operating element arrangement and also the method for its mounting can be developed according to the statements within the scope of this description, to which reference will therefore be made.

A further development of the invention provides that the rotational movement of the second adjustment element during mounting takes place from a starting angle of rotation to a final angle of rotation defined by means of an adjustment element end stop. As already explained, the second adjustment element is to be rotated over the entire second range of angles of rotation, which is limited on the one hand by the starting rotation angle and on the other hand by the final rotation angle. The second range of angles of rotation is larger than the first range of angles of rotation, so that the second adjustment element only moves the first adjustment element over the first part of the second range of angles of rotation. The second adjustment element is rotated starting from the starting angle of rotation until it rests against the adjustment element end stop. This is the case as soon as the second adjustment element is positioned below the final angle of rotation. This allows for simple and reproducible mounting of the operating element arrangement.

The features and feature combinations described in the description, in particular the features and feature combinations described below in the description of the figures and/or shown in the figures may be used not only in the respective combination specified, but also in other combinations or alone, without departing from the scope of the invention. The invention should therefore also be considered to comprise embodiments that are explicitly not shown or explained in the description and/or the figures, but emerge from the explained embodiments or can be derived from them.

BRIEF DESCRIPTION OF THE FIGURES

In the following, the invention will be explained in greater detail with reference to the exemplary embodiments depicted in the drawings, without this restricting the invention. In the figures.

DETAILED DESCRIPTION

Figure 1:
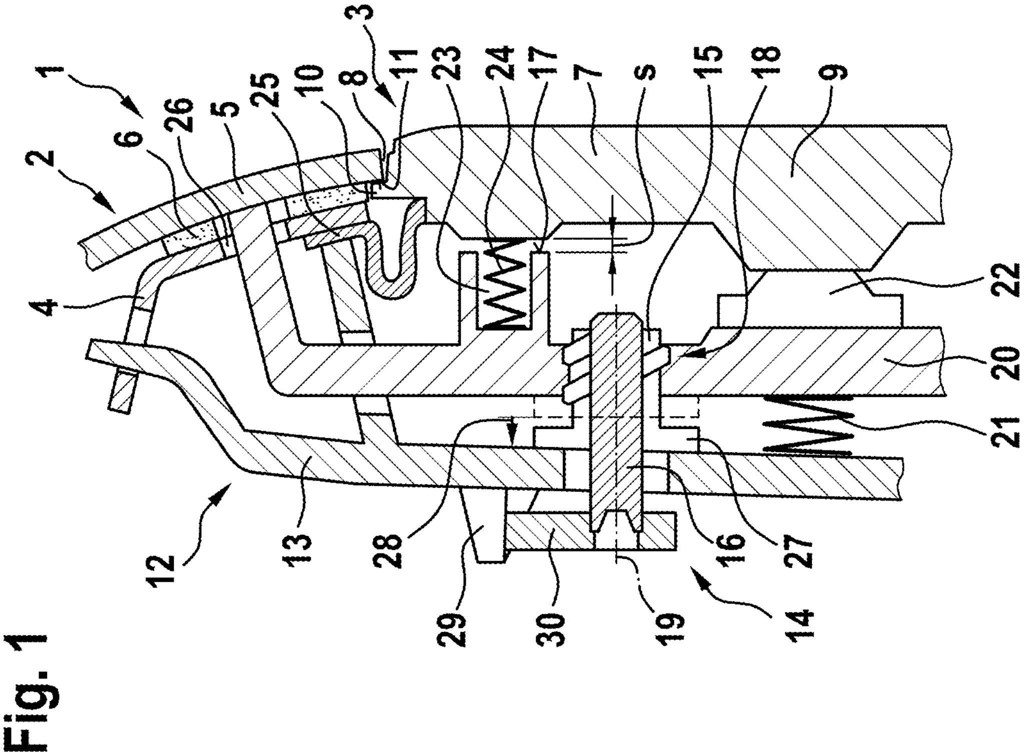
FIG. 1 shows a schematic representation of a region of a motor vehicle which has a body and an operating element arrangement attached to the body in a first embodiment.

FIG. 1 shows a schematic representation of a motor vehicle 1, which has a body 2 and an operating element arrangement 3 arranged on the body 2 in a first embodiment. The body 2 has a supporting structure 4 to which an outer skin 5 is attached, preferably in a material-locking manner, for example by means of an adhesive 6. The operating element arrangement 3 has an operating element 7 which is arranged in a recess 8 of the body 2, in particular the outer skin 5. The operating element 7 has a base element 9, which extends at least partially or even completely through the recess 8, and a collar 10 extending from the base element 9. In the first position of the operating element 7 shown here, the collar 10 rests against a first operating element end stop 11, which is formed by an edge delimiting the recess 8.

The operating element 7 is connected to the body 2 by means of an attachment device 12, namely in such a way that the operating element 7 can be displaced with respect to the body 2 along an actuation path. The attachment device 12 has a base body 13 which is fastened to the supporting structure 4, for example in a form-fitting manner as shown. Alternatively, the attachment device 12 can be fastened to the body 2 by means of bolts. In order to achieve a defined actuation path of the operating element 9 despite the large tolerances caused, for example, by the adhesive 6 between the supporting structure 4 and the outer skin 5, the operating element arrangement 3 also has an adjustment device 14. This has a first adjustment element 15, a second adjustment element 16, a second operating element end stop 17 and a threaded device 18.

The two adjustment elements 15 and 16 are mounted so as to rotate about a common axis of rotation 19. The second adjustment element 16 is coupled to the first adjustment element 15 in a force-fitting manner, for example by engaging with the first adjustment element 15 with a press fit as shown here. It can be provided that the second adjustment element 16 completely penetrates the first adjustment element 15 in the axial direction with respect to the axis of rotation 19. In principle, however, it is sufficient for the second adjustment element 16 to only partially penetrate or engage with the first adjustment element 15.

The first adjustment element 15 is drive-connected to an intermediate component 20 via the threaded device 18. Here, the first adjustment element 15 forms a first part of the threaded device 18, namely an external thread, and the intermediate component 20 forms a second part of the threaded device 18, namely an internal thread. The external thread of the first adjustment element 15 engages with the internal thread of the intermediate component 20, so that a rotational movement of the first adjustment element 15 causes an axial displacement of the intermediate component 20.

The operating element end stop 17 is formed on the intermediate component 20. Furthermore, a spring 21 is arranged between the attachment device 12 or its base body 13 and the intermediate component 20, which urges the intermediate component 20 away from the attachment device 12, i.e. in the direction of the operating element 7. An actuation sensor 22 is also arranged on the intermediate component 20, by means of which an actuation of the operating element 7 can be sensed. The operating element end stop 17 delimits a spring element receptacle 23 in which a spring element 24 is arranged, which rests on the one hand on the intermediate component 20 and on the other hand on the operating element 7. The spring element 24 urges the operating element 7 in the direction of the first operating element end stop 11, i.e. away from the operating element end stop 17, which forms a second operating element end stop 17.

In the illustrated embodiment, a seal 25 is also arranged between the attachment device 12, in particular its base body 13, and the supporting structure 4, which on the other hand is connected to the operating element 7. The seal 25 seals the recess 8 directly on its inner side, so that the penetration of moisture is reliably prevented. The adjustment device 14 serves to set an actuation path along which the operating element 7 can be displaced, in particular to set a length s of the actuation path. For this purpose, the distance between the operating element 7 resting on the first operating element end stop 11 and the second operating element end stop 17 can be adjusted, namely by means of the adjustment device 14.

When mounting the operating element arrangement 3 on the body 2, the attachment device 12 is first connected to the supporting structure 4. The spring 21 urges the intermediate component 20 in the direction of the operating element 7 until it rests against the outer skin 5 and is supported there. For example, the supporting structure 4 has a recess 26 through which the intermediate component 20 extends. By means of the spring 21, the desired length s of the actuation path is already set. However, when the operating element 7 is actuated, the intermediate component 20 can first be deflected by compressing the spring 21, so that the operating element 7 can be displaced beyond the actuation path.

For this reason, the second adjustment element 16 is rotated during mounting so that it takes the first adjustment element 15 with it due to the force-fitting connection. Due to the resulting rotational movement of the first adjustment element 15, the threaded device 18 causes the first adjustment element 15 to move out of the intermediate component 20 or the distance of a collar 27 of the first adjustment element 15 from the intermediate component 20 to increase. This is indicated by arrow 28. The first adjustment element 15 is carried by the second adjustment element 16 in the circumferential direction until the collar 27 rests against the attachment device 12 or the base body 13.

Subsequently, the first adjustment element 15 is blocked so that the second adjustment element 16 rotates relative to the first adjustment element 15. During mounting, the second adjustment element 16 is rotated from a starting angle of rotation to a final angle of rotation. The final angle of rotation is defined by an adjustment element end stop 29, against which the second adjustment element 16 rests in the final angle of rotation, for example with a boom 30. With the described design of the operating element arrangement 3, a quick and efficient installation on the motor vehicle is implemented.

Figure 2:
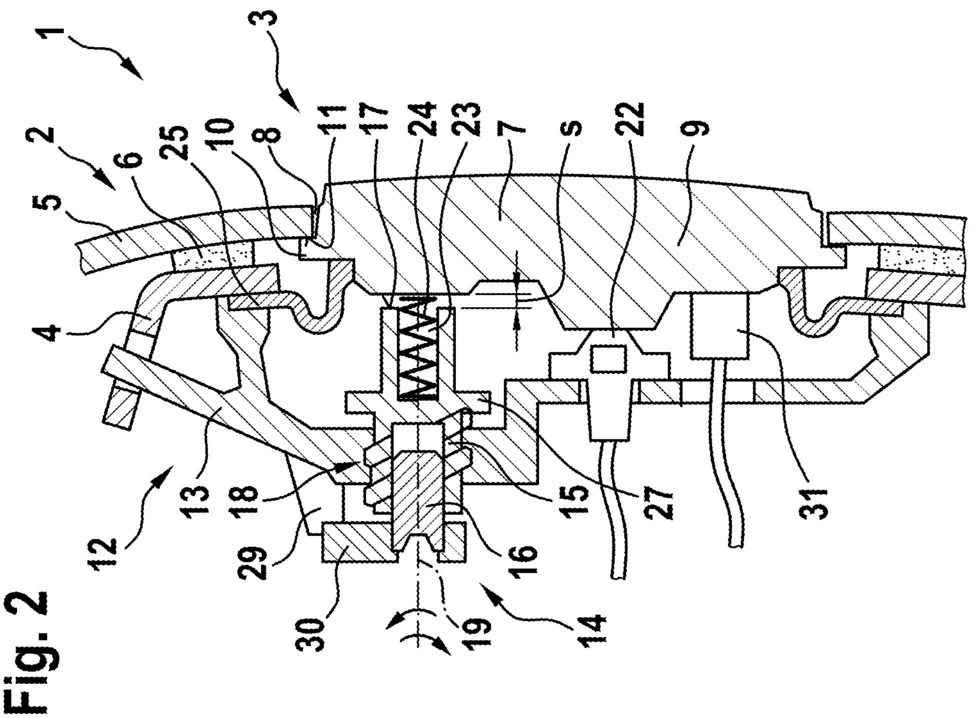
FIG. 2 shows a schematic representation of the motor vehicle, wherein the operating element arrangement is present in a second embodiment.

FIG. 2 shows the motor vehicle 1 with the operating element arrangement 3 in a second embodiment. With regard to the basic structure, reference is made to the above explanations and the differences are discussed below. These consist in the fact that the intermediate component 20 is omitted. The first adjustment element 15 now interacts with the attachment device 12 or its base body 13 via the threaded device 18. In addition to the elements already mentioned, there is a power connection 31, by means of which, for example, a lighting of the operating element 7 can be supplied with electrical power. Such a power connection 31 can of course also be provided in the first embodiment.

The sealing of the operating element arrangement 3 is again carried out using the seal 25. However, it goes without saying that the seal 25 can also be omitted and replaced by other seals. For example, in this case it would be useful to arrange a seal between the first adjustment element 15 and the attachment device 12. A further seal would have to be provided between the actuation sensor 22 and the attachment device 12 and a third seal would have to be used to seal the power connection 31. The latter can, for example, be in the form of an elastic bellows in which an electrical line of the power connection 31 runs. If the seal 25 is omitted, a drainage connection could also be present which opens into a space between the operating element 7 and the attachment device 12. The drainage connection allows moisture present in the room to be drained away towards the outside environment, preferably due to the influence of gravity on the moisture.

During mounting of the operating element arrangement 3 on the motor vehicle 1, the first adjustment element 15 is again first rotated from the starting angle of rotation in the direction of the final angle of rotation, i.e. until the second adjustment element 16 interacts with the adjustment element end stop 29. Over this mounting angle of rotation, the second adjustment element 16 drives the first adjustment element 15 via the force-fitting connection, namely until the first adjustment element 15 with the second operating element end stop 17 rests on the operating element 7 and this in turn rests on the first operating element end stop 11. By turning the second adjustment element 16, the first adjustment element 15 is pushed against the operating element 7 and the latter is displaced in the direction of the first operating element end stop 11 until it rests against it.

Consequently, the operating element 7 is held clamped between the two operating element stops 11 and 17, so that the length of the actuation path is initially zero. In order to set the desired length of the actuation path, the second adjustment element 16 is therefore rotated counter to the mounting direction of rotation, whereby the first adjustment element 15 is in turn taken along and moves away from the operating element 7. The second adjustment element 16 is rotated counter to the mounting direction of rotation up to a defined angle of rotation in which the second operating element end stop 17 has the desired distance from the operating element 7, so that the desired length of the actuation path is set.

Figure 3:
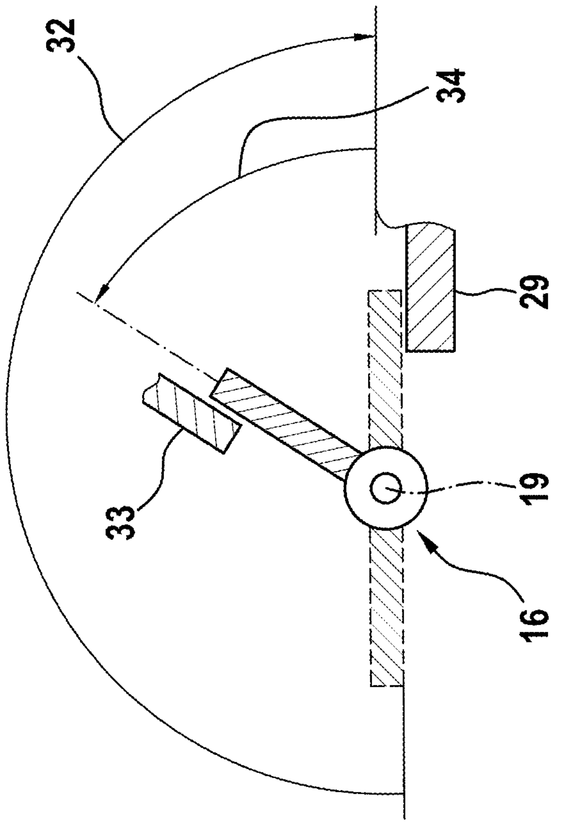
FIG. 3 shows a schematic representation of a region of the operating element arrangement in an alternative view.

FIG. 3 shows a schematic representation of a region of the operating element arrangement 3 in an alternative view. In particular, the second adjustment element 16 is shown in different rotation angle positions with respect to the common rotation axis 19. An arrow 32 shows the rotational movement of the second adjustment element 16 from the starting rotation angle to the final rotation angle, in which the second adjustment element 16 interacts with the adjustment element end stop 29 or rests against it. Between the starting angle of rotation and the final angle of rotation there is a locking angle of rotation which is defined by an adjustment element locking device 33.

The adjustment element locking device 33 is designed such that it allows the rotational movement of the second adjustment element 16 starting from the starting angle of rotation in the direction of the final angle of rotation over the locking angle of rotation. In the opposite direction, i.e. opposite to the mounting direction of rotation, the rotational movement of the second adjustment element 16 is limited to the locking angle of rotation. The second adjustment element 16 is thus displaced from the final angle of rotation back in the direction of the starting angle of rotation, according to the arrow 34, however, only up to the locking angle lying between the starting angle of rotation and the final angle of rotation.

The difference between the final angle of rotation and the locking angle of rotation is dimensioned such that after turning the second adjustment element 16 from the final angle of rotation to the locking angle of rotation, the desired length of the actuation path is set, i.e. the desired distance between the second operating element end stop 17 and the operating element 7 resting against the first operating element end stop 11 is present.

The described design of the operating element arrangement 3 or of the motor vehicle 1 has the advantage that the operating element arrangement 3 can be quickly mounted on the body 2 of the motor vehicle 1, while at the same time the actuation path is adjusted to the desired length. During mounting, the second adjustment element 16 is always rotated over the same range of rotation angles, regardless of the tolerances. The adjustment of the actuation path takes place automatically.

LIST OF REFERENCE NUMERALS

1 motor vehicle
2 body
3 operating element arrangement
4 supporting structure
5 outer skin
6 adhesive
7 operating element
8 recess
9 base element
10 collar
11 1. operating element end stop
12 attachment device
13 base body
14 adjustment device
15 1. adjustment element
16 2. adjustment element
17 2. operating element end stop
18 threaded device
19 axis of rotation
20 intermediate component
21 spring
22 actuation sensor
23 spring element receptacle
24 spring element
25 seal
26 recess
27 collar
28 arrow
29 adjustment element end stop
30 boom
31 power connection
32 arrow
33 adjustment element locking device
34 arrow

The invention claimed is:

1. An operating element arrangement for a motor vehicle, comprising: an operating element and an attachment device for connecting the operating element to a body of the motor vehicle, wherein the operating element is mounted on the attachment device so as to be displaceable along an actuation path, wherein an adjustment device for adjusting the actuation path has a first adjustment element, a second adjustment element frictionally coupled to the first adjustment element, an operating element end stop for limiting the actuation path and a threaded device, wherein the first adjustment element is mounted so as to be rotatable over a first range of rotation angles and the second adjustment element over a second range of rotation angles about a common axis of rotation, and wherein the adjustment device is designed such that a rotary movement of the second adjustment element over a first part of the second range of rotation angles by the threaded device causes a displacement of the first adjustment element in the axial direction and takes place over a second part of the second range of rotation angles with the first adjustment element fixed in the axial direction.

2. The operating element arrangement according to claim 1, wherein the operating element is guided with respect to a base body of the attachment device by at least one guide device, and/or the operating element end stop is spaced apart from the operating element in a first position of the operating element and rests against the operating element in a second position of the operating element to limit the actuation path.

3. The operating element arrangement according to claim 1, wherein the operating element end stop is designed on the first adjustment element or is present on an intermediate component which is drive-coupled to the first adjustment element via the threaded device.

4. The operating element arrangement according to claim 1, wherein the operating element end stop engages around a spring element receptacle in which a spring element urging the operating element in the direction facing away from the operating element end stop is arranged.

5. The operating element arrangement according to claim 1, wherein the attachment device has an actuation sensor for determining a deflection of the operating element along the actuation path.

6. The operating element arrangement according to claim 1, wherein the second range of rotation angles extends from a starting angle of rotation to a final angle of rotation and is limited to the final angle of rotation by an adjustment element end stop.

7. The operating element arrangement according to claim 1, wherein the adjustment device has an adjustment element locking device which allows a rotational movement of the second adjustment element from the direction of the starting angle of rotation in the direction of the final angle of rotation over a locking angle of rotation and prevents a rotational movement of the second adjustment element from the direction of the final angle of rotation in the direction of the starting angle of rotation in the locking angle of rotation.

8. The operating element arrangement according to claim 1, wherein the threaded device is designed such that during the rotational movement of the second adjustment element in the direction of the final angle of rotation, the operating element end stop is displaced towards the operating element or a minimum distance between the base body of the attachment device and the intermediate component is increased.

9. The operating element arrangement according to claim 2, wherein the operating element end stop is designed on the first adjustment element or is present on an intermediate component which is drive-coupled to the first adjustment element via the threaded device.

10. The operating element arrangement according to claim 2, wherein the operating element end stop engages around a spring element receptacle in which a spring element urging the operating element in the direction facing away from the operating element end stop is arranged.

11. The operating element arrangement according to claim 3, wherein the operating element end stop engages around a spring element receptacle in which a spring element urging the operating element in the direction facing away from the operating element end stop is arranged.

12. The operating element arrangement according to claim 2, wherein the attachment device has an actuation sensor for determining a deflection of the operating element along the actuation path.

13. The operating element arrangement according to claim 3, wherein the attachment device has an actuation sensor for determining a deflection of the operating element along the actuation path.

14. The operating element arrangement according to claim 4, wherein the attachment device has an actuation sensor for determining a deflection of the operating element along the actuation path.

15. The operating element arrangement according to claim 2, wherein the second range of rotation angles extends from a starting angle of rotation to a final angle of rotation and is limited to the final angle of rotation by an adjustment element end stop.

16. The operating element arrangement according to claim 3, wherein the second range of rotation angles extends from a starting angle of rotation to a final angle of rotation and is limited to the final angle of rotation by an adjustment element end stop.

17. The operating element arrangement according to claim 4, wherein the second range of rotation angles extends from a starting angle of rotation to a final angle of rotation and is limited to the final angle of rotation by an adjustment element end stop.

18. The operating element arrangement according to claim 5, wherein the second range of rotation angles extends from a starting angle of rotation to a final angle of rotation and is limited to the final angle of rotation by an adjustment element end stop.

19. A method for mounting an operating element arrangement to the body of a motor vehicle, wherein the operating element arrangement has an operating element and an attachment device for connecting the operating element to a body of the motor vehicle, and the operating element is mounted on the attachment device so as to be displaceable along an actuation path, wherein an adjustment device for adjusting the actuation path has a first adjustment element, a second adjustment element frictionally coupled to the first adjustment element, an operating element end stop for limiting the actuation path and a threaded device, wherein the first adjustment element is mounted so as to be rotatable over a first range of rotation angles and the second adjustment element over a second range of rotation angles about a common axis of rotation, and wherein during mounting, a rotary movement of the second adjustment element is brought about and the adjustment device is designed such that the rotary movement of the second adjustment element over a first part of the second range of rotation angles by the threaded device causes a displacement of the first adjustment element in the axial direction and takes place over a second part of the second range of rotation angles with the first adjustment element fixed in the axial direction.

20. The method according to claim 19, wherein the rotational movement of the second adjustment element during mounting takes place from a starting angle of rotation to a final angle of rotation defined by an adjustment element end stop.

* * * * *